Jan. 1, 1963    R. T. ANDRÉ ET AL    3,071,265
SUGAR-CANE LOADER AND DITCHER COMBINATION
Filed Oct. 30, 1958    4 Sheets-Sheet 1
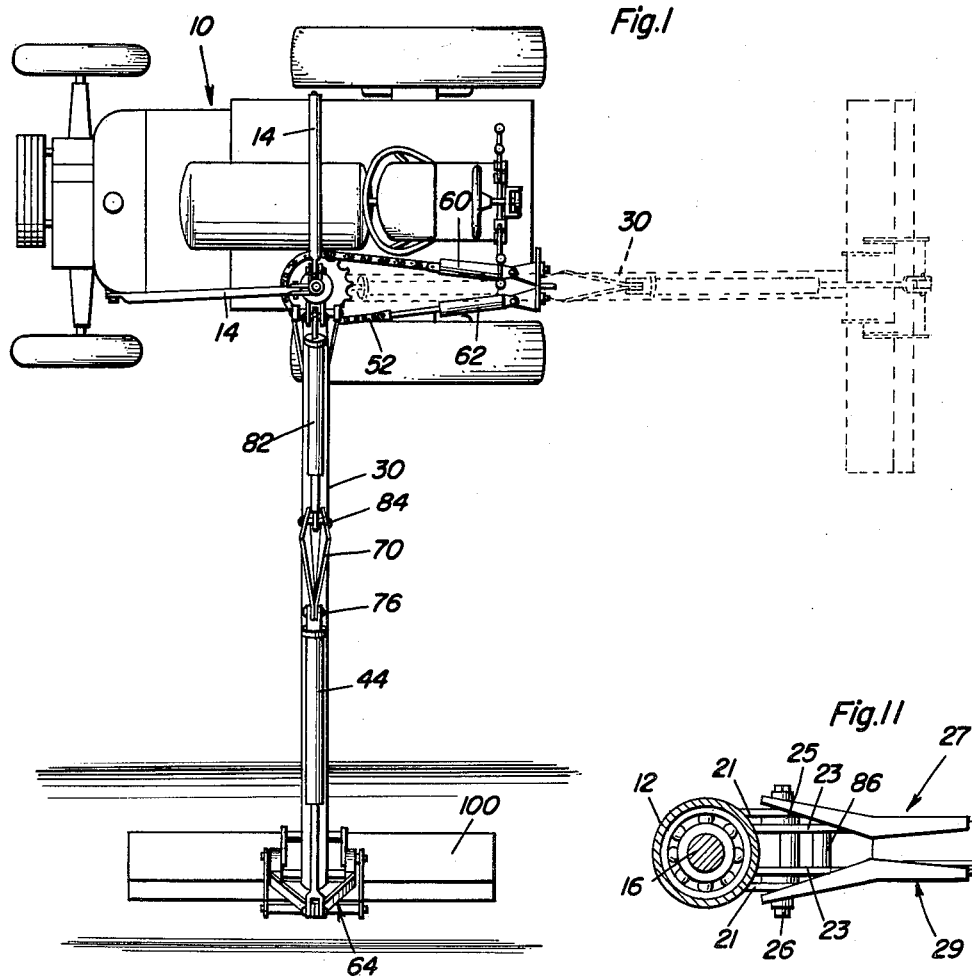
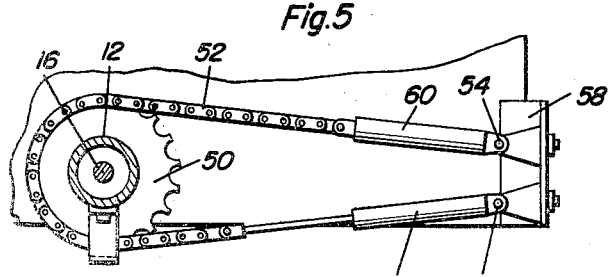
Robert T. André
James Hays Edley
INVENTORS

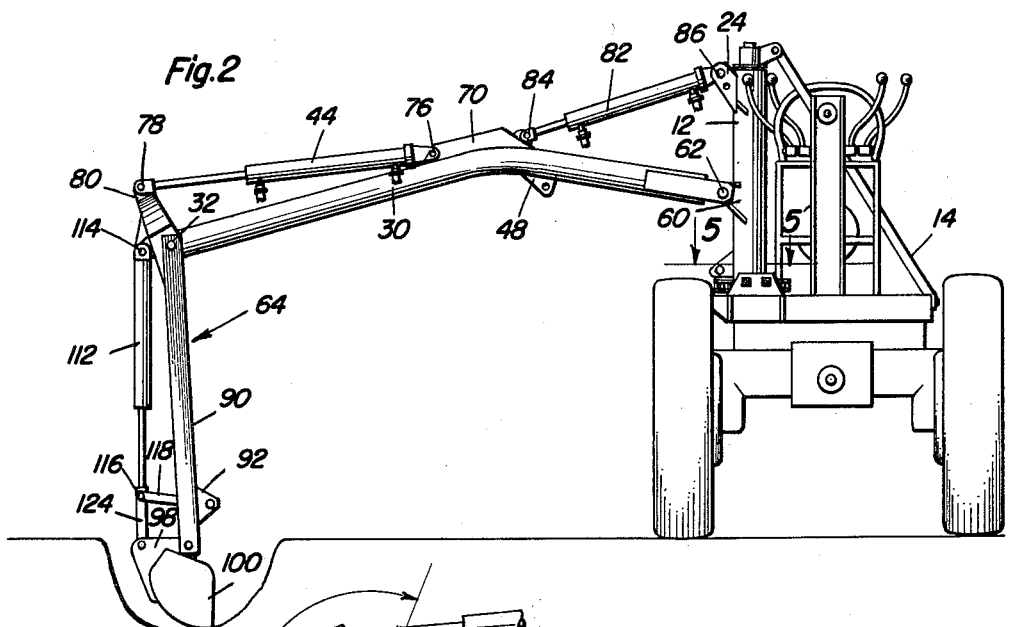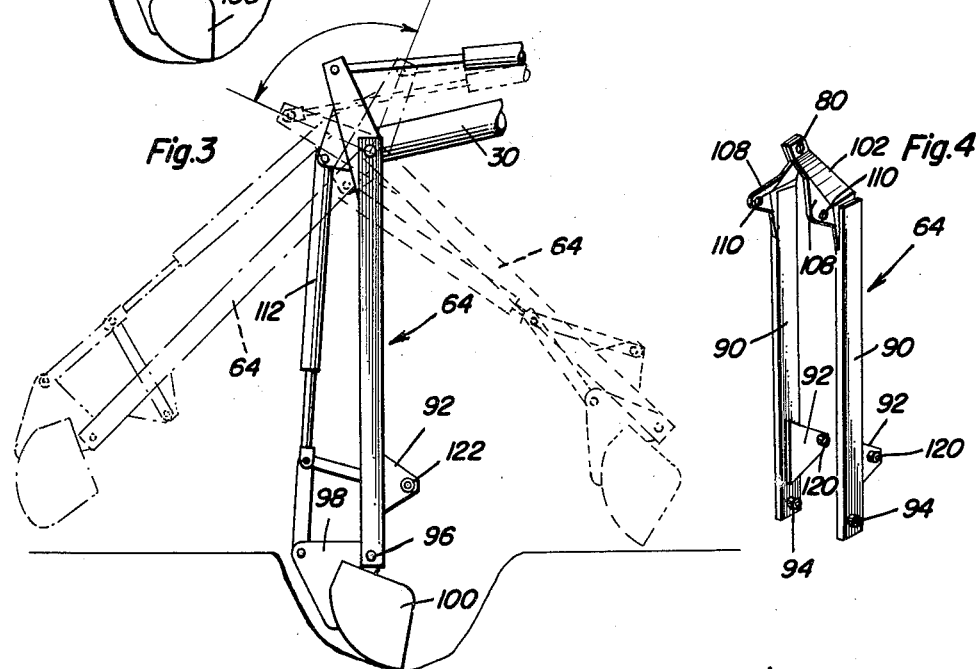

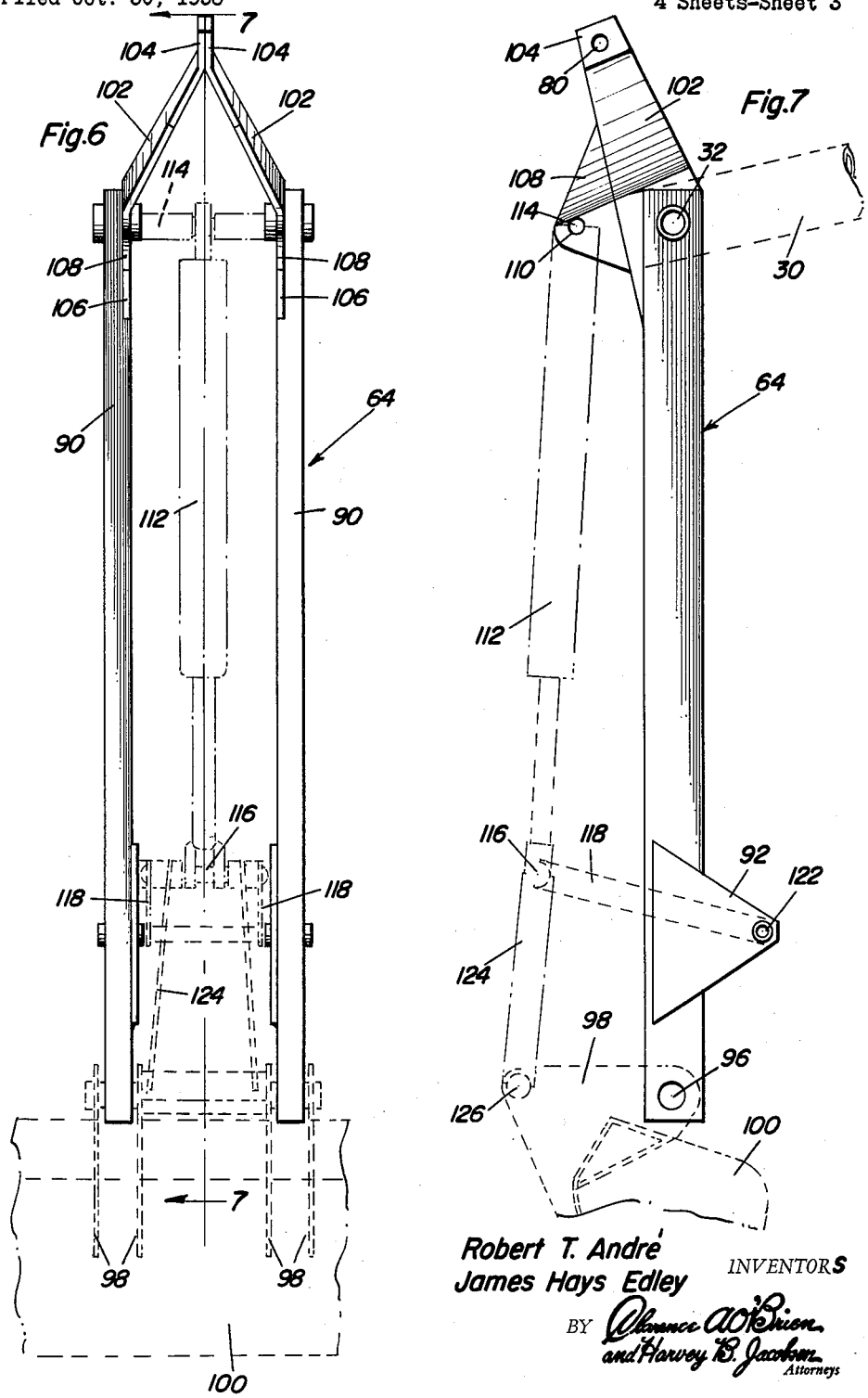

Jan. 1, 1963  R. T. ANDRE ET AL  3,071,265
SUGAR-CANE LOADER AND DITCHER COMBINATION
Filed Oct. 30, 1958  4 Sheets-Sheet 4
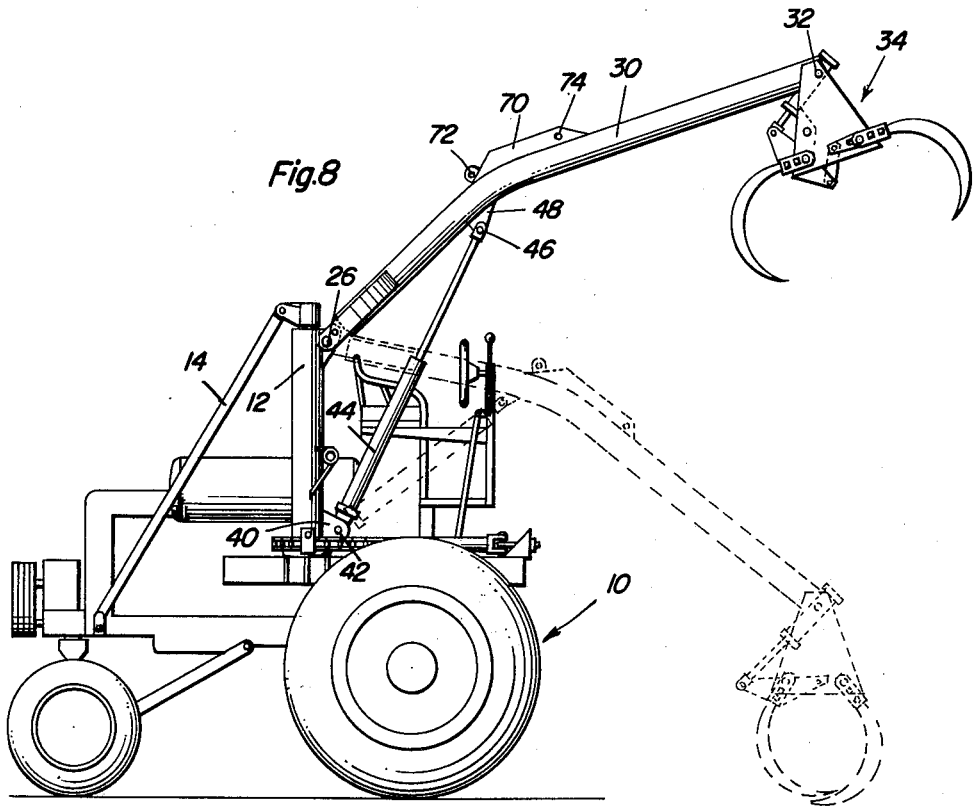
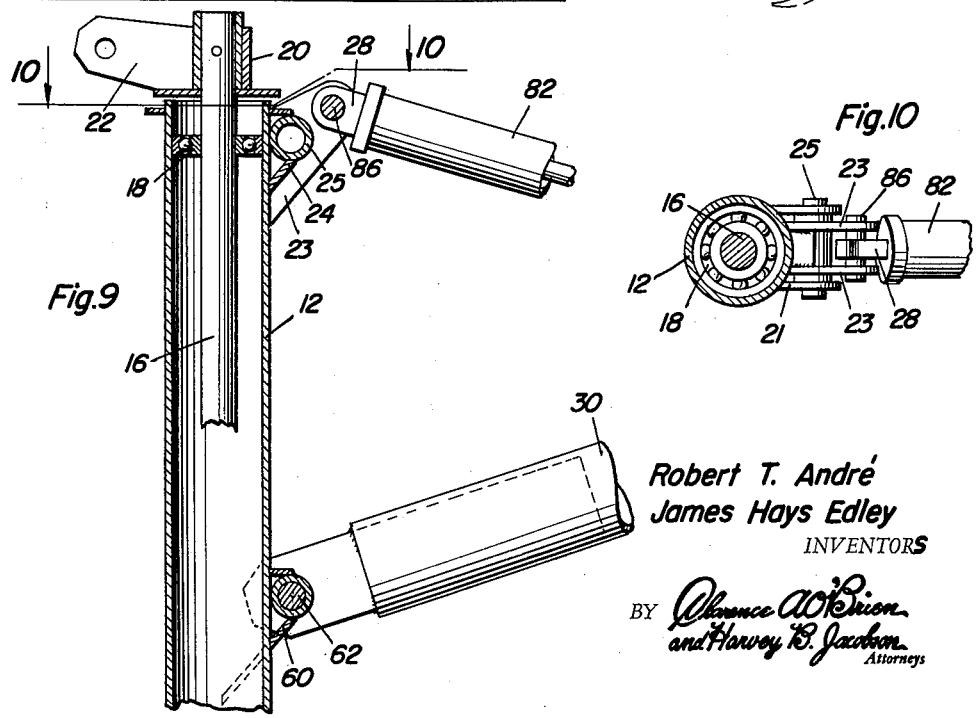
Robert T. André
James Hays Edley
INVENTORS United States Patent Office 3,071,265
Patented Jan. 1, 1963

3,071,265
SUGAR-CANE LOADER AND DITCHER
COMBINATION
Robert T. André, New Iberia, and James Hays Edley, Jeanerette, La., assignors to J & L Engineering Co., Inc., Jeanerette, La., a corporation of Louisiana
Filed Oct. 30, 1958, Ser. No. 770,684
12 Claims. (Cl. 214—138)

This invention comprises a novel and useful sugar-cane loader and ditcher combination and more particularly relates to means for converting a conventional sugar-cane loader into a device for excavating and cleaning ditches in a sugar-cane field.

The cultivation and harvesting of sugar-cane is geographically located substantially entirely in the State of of Louisiana and the area contiguous thereto. Consequently, there is a very limited market for power operated equipment specifically designed for use in the cultivation and harvesting of sugar-cane. The cultivation and harvesting of sugar-cane in quantity, owing to the particular conditions under which the cane is cultivated and harvested, is relatively expensive. It has been heretofore customary to employ one form of power operated machinery specifically designed for the loading of the harvested sugar-cane upon trucks or other conveying means for removing the cane from the field to the refinery and a second and different type of machine for excavating and cleaning the drainage ditches necessary in sugar-cane fields. Since the truck portion of such machines is substantially identical, a considerable and important saving in the cost of the equipment would be effected if it were possible to use the same wheeled frame of the apparatus for successively and alternatively supporting and powering a loading grapple for the harvesting of sugar-cane and an excavating device for excavating and cleaning the drainage ditches of a field of sugar-cane.

It is therefore the primary object of this invention to provide a means whereby a conventional sugar-cane loader may be readily converted to use as a power operated ditcher for sugar-cane fields.

It is a further object of the invention to provide a means in accordance with the foregoing object whereby the ditching operation may be performed with much greater ease and certainty than has been heretofore possible by the prior and conventional use of power operated drag lines, back hoes and the like.

Still another object of the invention is to provide a means whereby a conventional sugar-cane loader may be converted for use as a ditcher with a minimum change in its parts and with a minimum of labor being required to effect the conversion.

A still further object of the invention is to provide a means whereby a sugar-cane loader may be converted for use as a ditcher by retaining for use in the ditcher the rotary mast, power operated boom, and by replacing the power operated grapple with a power operated scoop or shovel and by a slight rearrangement of the parts.

Still another object of the invention is to provide a sugar-cane ditching machine in which the ditching shovel may with equal facility deposit the excavated dirt from the ditch to either side thereof, or to one end of the machine as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view showing a sugar-cane loader converted for use as a ditcher in accordance with this invention, and showing in full lines the position of the excavating mechanism for excavating and cleaning a ditch to one side of the machine, and in dotted lines showing the position of the excavating shovel for unloading the excavated earth or for cleaning a transverse ditch at one end of the machine;

FIGURE 2 is an end elevational view of the apparatus of FIGURE 1 and showing the manner in which the excavating shovel is supported upon the machine and operated in excavating a ditch at one side of the machine;

FIGURE 3 is a fragmentary view of a portion of FIGURE 2 and showing in full lines the position of the excavating shovel and its support arm during the excavation of a ditch, and showing in dotted lines the manner in which the shovel is caused to dump its earth to either side of the ditch;

FIGURE 4 is a perspective view of the shovel arm structure which is applied to the power operated boom of the conventional cane loader in place of the power operated grapple which forms a part of the conventional loader as shown in FIGURE 8;

FIGURE 5 is a detail view in horizontal section taken substantially upon the plane indicated by the section line 5—5 of FIGURE 2 but upon an enlarged scale and in particular illustrating the mechanism by which horizontal swinging movement about a vertical axis is imparted to the mast of the power operated mechanism of the convertible loader or excavator in accordance with this invention;

FIGURE 6 is an enlarged elevational view of the shovel support arm showing the power operated means of the shovel attached thereto and the attachment of this arm to a portion of the shovel;

FIGURE 7 is a vertical sectional view taken substantially upon the plane indicated by the section line 7—7 of FIGURE 6 and showing further structural details and arrangement of the parts of the mechanism of FIGURE 6;

FIGURE 8 is a side elevational view of the conventional sugar-cane loader which is to be converted by this invention into a ditch excavator, the loading grapple being shown in its raised position in full lines and in its lowered position in dotted lines for grasping a pile of sugar-cane for loading the same;

FIGURE 9 is a detail view upon an enlarged scale and in vertical central section through the vertical, horizontally swinging mast of the apparatus and showing the manner in which the same is converted for use as a ditcher;

FIGURE 10 is a horizontal sectional view taken substantially upon the plane indicated by the section line 10—10 of FIGURE 9; and FIGURE 11 is a view similar to FIGURE 10 but showing the arrangement when the apparatus is assembled as in FIGURE 8 to constitute a cane loader.

Reference is made first to FIGURE 8 which shows a conventional sugar-cane loader of a type now available upon the open market and which is employed for lifting the piles of cut sugar cane for loading the same upon a truck or other transporting means to a refinery. This apparatus includes the usual mobile power operated chassis or frame 10 upon which is mounted a vertical mast or support post 12 having brace rods as at 14. As shown in FIGURE 9, the mast 12 is hollow, and has a stationary axle or shaft 16 extending therethrough, suitable bearings being provided as at 18 whereby the post or mast is rotatable about the vertical axis of the shaft 16. A collar 20 with a bracket 22 is secured to the projecting upper end of the shaft 16, the brace means 14 being secured to this bracket to thereby rigidly mount and support the mast in erect vertical position, and in which the mast is capable of swinging movement about the vertical shaft 16.

At the upper end of the mast 12 as shown in both FIGURES 10 and 11 and as will be further apparent from FIGURE 9, there is a laterally projecting support bracket assembly represented generally by the numeral 24. The bracket assembly comprises four parallel plates, welded or otherwise rigidly secured to the mast 12 and arranged in pairs in two sets. The pair of relatively short plates 21 is a part of the conventional mast of this apparatus and these plates have secured thereto and support a transverse bushing or sleeve 25 which constitutes a journal to which is removably pivoted by a pivot pin 26, a hollow boom 30 which also is an element of the conventional cane loader.

The second pair or set of relatively larger plates 23 is applied to the mast 12 between the plates 21 in accordance with this invention and are likewise apertured to receive and be secured to the bushing or sleeve 25. In addition, above and outwardly of the sleeve 25, the added plates 23 are apertured to receive a pivot pin 86 for a purpose to become subsequently apparent.

As shown particularly in FIGURE 11, one end of the boom 30 has a pair of parallel plates 27 and 29 rigidly secured to and projecting beyond the end of the boom and apertured to receive the pivot pin 26 whereby the boom is removably pivoted to the support bracket assembly 24 at the bushing or sleeve 25.

Pivotally and detachably connected as by a pivot pin 32 at the outer end of the boom 30 is a conventional grapple assembly designated generally by the numeral 34. Inasmuch as this grapple assembly is conventional in the art and the structure thereof in itself forms no part of the present invention, a further description of the details of the same is deemed to be unnecessary.

Adjacent its lower end, the mast 12 is provided in the vertical plane of the mounting bracket assembly 24 with a second mounting bracket 40 to which is pivotally secured as by a removable pivot pin 42 the lower end of a fluid pressure actuating cylinder and piston unit 44, whose upper end is pivoted detachably as by a pivot pin 46 to a bracket 48 carried by the boom. It will thus be seen that by proper actuation of the cylinder 44, the boom will be raised or lowered about its pivotal connection 26, to thereby perform its desired functions. It will be understood that the fluid pressure actuating means for operating the opening and closing of the grapples of the assembly 34, and for actuating the fluid pressure cylinder unit 44 to raise or lower the boom are operated by the conventional fluid pressure operating means, not shown, with which the device is customarily provided.

Referring now more particularly to FIGURE 5, it will be seen that there is secured to the lower end of the mast 12 a sprocket wheel 50 and a sprocket chain 52 is trained about this wheel. Secured as by pivot pins 54 and 56 to suitable lugs on a support bracket 58 are a pair of fluid pressure actuated cylinder and piston units 60 and 62 respectively which in turn are connected to the opposite ends of the sprocket chain 52. By operation of these units with the conventional power control of the vehicle, the sprocket wheel 50 and consequently the mast 12 may be rotated thereby horizontally swinging the boom from one side to the other as desired.

As thus far described it will be understood that the conventional cane loader is operable to grab and lift a bundle of cane stalks from the ground and swing them horizontally to a position at the end of or at either side of the machine for loading these stalks.

Referring now specifically to FIGURES 1–4, in conjunction with FIGURES 6 and 7, there will now be explained the manner and the means by which the power operated cane loader may be readily converted to function as a power operated ditching machine.

In accordance with this invention there is provided upon the mast 12 a further laterally extending mounting bracket 60 having a pivot pin 62 therein whose axis is horizontal and parallel to that of the previously mentioned boom pivot pin 26. In converting the device from a cane loader to a cane ditcher, the previously mentioned boom 30 has its grapple assembly 34 removed therefrom by disconnecting the pin 32 and the hydraulic lines connected to the grapple assembly. In place of this grapple assembly there is now mounted a shovel assembly designated generally by the numeral 64, the upper end of the shovel assembly being hinged to the end of the boom 30 by the pivot pin 32 previously mentioned. The boom 30 is removed from the upper bracket 24 by disengaging the hinge pin 26 and is secured to the lower bracket 60 by the pin 62.

In accordance with this invention there is welded or otherwise rigidly secured to the upper surface of the boom intermediate its ends an upstanding bracket 70 having a pair of apertures 72 and 74 therein. The previously mentioned fluid pressure operated cylinder and piston unit 44 is removed from the position shown in FIGURE 8 and now is pivotally connected as shown in FIGURE 2 by the pivot pins 76 and 78 to the bracket 70 at the aperture 74 thereof and to the apertured upstanding ear 80 at the upper end of the shovel assembly 64. In addition, another fluid pressure fluid operated cylinder unit 82 is pivotally connected by the pivot pins 84 and 86 to the aperture 72 in the bracket 70 and to the aperture of the support bracket 24 on the mast 12 as shown in FIGURE 7. Thus, as now mounted upon the mast, the boom can be raised or lowered by operation of the unit 82 and the excavating shovel assembly 64 can be operated by actuation of the cylinder unit 44, while the mast 12 may be swung horizontally about its vertical axis by the conventional mechanism previously described for that purpose.

Referring now specifically to FIGURE 4, in conjunction with FIGURES 6 and 7, it will be seen that the excavator assembly 64 consists of a rigid frame which is generally U-shaped, having a pair of side arms 90 disposed in parallel relation and open at their lower ends, these arms having secured to their inside surfaces a pair of parallel laterally projecting triangular shaped plates 92 which are welded or otherwise fixedly secured to the arms. At the lowermost ends, the arms are provided with bushings or apertures 94 therethrough for the reception of pins 96 which pivotally engage the support brackets 98 of an elongated ditching shovel 100 of a conventional type. At their upper ends the arms 90 are connected by a V-shaped assembly comprising upwardly converging bars or straps 102 which at their upper ends are provided with juxtaposed side-by-side flat extremities 104 which comprise the previously mentioned apertured ear 80. At their lower divergent ends, the plates 102 have parallel portions 106 which are welded or otherwise rigidly secured to the inside surfaces of the arms 90. These plates are provided with laterally offset bracket portions 108 each of which is apertured as at 110. A fluid pressure operated piston and cylinder unit 112 is pivotally connected as by pivot pin 114 at its upper end to the previously mentioned apertures 110 in the brackets 108, while the lower end of this unit is pivoted as at 116 to links 118 which in turn are pivoted to bushings or eyes 120, as by pivot pins 122, these eyes being formed at the apices of the triangular brackets 92. The fluid pressure actuated unit 112 is likewise pivoted by the pivot pin 116 to a further pair of links 124 whose lower ends are pivoted to the previously mentioned mounting brackets 98 as by pivot pins 126.

It will be understood that the fluid pressure supply for actuating the series of cylinders 44, 82 and 112 will be connected to the fluid pressure actuating means of the vehicle in a manner well understood in the art.

With the arrangement as above described, the loading machine has now been converted to a power operated ditching machine. By swinging the boom horizontally, as shown in FIGURE 1, the shovel 100 may be caused to excavate or to clean a ditch lying to one side of the apparatus as shown. In addition, by rotating the mast to the dotted line position shown in FIGURE 1, the machine may be employed to clean or excavate a ditch lying transversely of the line of travel of the apparatus. Thus, there is provided a device wherein the shovel may be readily positioned to dig at the side of or at one end of the apparatus, or to discharge the material excavated by the shovel.

With the shovel in position, and as shown in FIGURES 2 and 3, manipulation of the actuating cylinder 112 will cause the shovel to rotate about its pivot pins 96 and thus excavate dirt from the earth. Thereafter, or in conjunction therewith, by manipulating the cylinder 44, the excavating arm assembly 64 may be swung about the pivot or hinge pin 32 to complete the excavating of the ditch, and/or to lift the shovel therefrom. Still further, by manipulating the cylinder 82, the boom may be raised to lift the filled shovel from the ditch. Thereafter, the cylinder 112 may be again actuated in conjunction with operation of the cylinder 44 to cause the shovel to discharge its contents to either side of the ditch as shown in dotted lines in FIGURE 3. It will be understood that this discharging operation may also be effected at any location in the horizontal swinging movement of the boom as previously mentioned.

The present invention therefore enables a very complete control to be obtained in the positioning of the shovel for excavating and in the dumping of the shovel after it has performed its digging function. The device therefore enables the apparatus to be very easily maneuvered in a sugar-cane field for ditching operations to be performed therein, and enables the relatively expensive power operated conventional cane loader to be converted at a minimum cost into a power operated ditching machine specifically designed for use in sugar-cane fields.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in a convertible digger and loader for sugar cane cultivation of the type including a vertical mast and a boom pivoted thereto, said mast being mounted at its lower end for turning about a vertical axis upon a wheeled vehicle frame intermediate the ends and at one side of the latter, said mast having laterally projecting and vertically spaced brackets thereon, a single fluid pressure actuated cylinder and piston unit detachably connected to said mast at one of said brackets and to said boom for pivotally raising and lowering the latter; a conversion boom having a first pivot connection at one end for interchangeably receiving and supporting selectively a complete digger assembly and a complete loader assembly, a second pivot connection at the other conversion boom end for selective mounting upon one of a pair of said mast brackets whereby to pivotally mount said conversion boom on said mast at vertically spaced positions for selective digging and loading operations, said conversion boom further including a pair of intermediate pivot connections between its ends for interchangeable connection of said single fluid pressure actuated cylinder and piston unit when the latter is connected to said digger assembly and for connection to a second fluid pressure actuated cylinder and piston unit when the latter is connected to one of said mast brackets.

2. The combination of claim 1 wherein said pair of intermediate pivot connections project above the top surface of said boom.

3. The combination of claim 1 including a third intermediate pivot connection on said boom projecting downwardly below the underside of the latter for attachment to said single fluid pressure actuated unit when the latter is connected to one of said mast brackets for loading operation.

4. A conversion boom for a convertible digger and loader for sugar cane cultivation of the type including a vertical mast having provision for pivotally mounting thereon a vertically swinging boom, said conversion boom comprising a boom, a first pivot connection on one end of said boom for interchangeably mounting thereon a complete digger assembly and a complete loader assembly, a second pivot connection on the other end of said boom by which the latter is selectively pivoted to a mast at vertically spaced loading and digging positions, first and second brackets on said boom intermediate said ends projecting respectively upwardly and downwardly therefrom, said second bracket being positioned on said boom for connection with a first fluid pressure actuating unit when the latter is connected to said mast and said boom is mounted in loading position, said first bracket being positioned on said boom for connection with said first fluid pressure actuating unit when the latter is connected to a complete digger assembly pivoted to said boom at said one end and for connection to a second fluid pressure actuating unit when the latter is connected to said mast and said boom is mounted on the mast in digging position.

5. The combination of claim 4 wherein said first and second brackets are secured to the top and bottom surfaces respectively of said boom, said first bracket having a pair of pivot receiving apertures therein spaced longitudinally of said boom.

6. A convertible digger and loader for sugar cane cultivation comprising; a mobile support frame, a vertical mast mounted on said frame between the ends thereof for turning about a vertical axis, a boom pivoted at one end to said mast for vertical swinging and projecting laterally from said mast for turning therewith, a complete digger assembly and a complete loader assembly selectively and removably directly pivotally connected to the other end of said boom, means on said frame connected to said mast for turning the mast and boom about said vertical axis through the angle lying between a position extending forwardly of said frame to a position extending perpendicularly from one side of said frame, a first actuator pivotally connected to said mast and to the midportion of said boom for effecting vertical swinging of the latter when a load assembly is mounted thereon and interchangeably connected to said midportion of said boom and to a digger assembly when the latter is mounted on said boom and a second actuator pivotally connected to said mast and to the midportion of the boom for effecting vertical swinging of the latter when a digger asesmbly is mounted on the booms.

7. The combination of claim 6 wherein said mast is supported solely upon said frame.

8. The combination of claim 6 wherein said mast is disposed upon said frame on one side thereof.

9. The combination of claim 6 wherein said boom constitutes an elongated member and includes a pair of pivot connections intermediate its ends for selective connection to said first and second actuators when said digger assembly is pivoted to said boom.

10. The combination of claim 6 wherein said mast includes a plurality of vertically spaced pivot brackets, said boom having said one end thereof interchangeably pivoted to one of a pair of said brackets whereby to vary the vertical range of the swinging movement of the boom for use with said digger and loader assemblies.

11. The combination of claim 10 wherein said boom constitutes an elongated member and includes a pair of pivot connections intermediate its ends for selective connection to said first and second actuators when said digger assembly is pivoted to said boom.

12. The combination of claim 11, said elongated member having a third pivot connection intermediate its ends and projecting downwardly below its underside for attachment to said first actuator when the latter is pivoted to said mast and when said boom is mounted upon said mast upon an upper one of said mast pivot brackets.

References Cited in the file of this patent

UNITED STATES PATENTS

| | | |
|---|---|---|
| 2,674,380 | Boudreaux | Apr. 6, 1954 |
| 2,674,385 | Stauth | Apr. 6, 1954 |
| 2,759,616 | Weyhausen | Aug. 21, 1956 |
| 2,764,306 | Dorkins | Sept. 25, 1956 |
| 2,768,499 | Pilch | Oct. 30, 1956 |
| 2,828,038 | Dorkins | Mar. 25, 1958 |
| 2,834,489 | Davis | May 13, 1958 |
| 2,846,094 | Pilch | Aug. 5, 1958 |

FOREIGN PATENTS

| | | |
|---|---|---|
| 155,789 | Australia | Mar. 22, 1954 |
| 200,729 | Australia | Jan. 25, 1956 |
| 774,162 | Great Britain | May 8, 1957 |
| 777,442 | Great Britain | June 26, 1957 |
| 1,157,133 | France | Dec. 23, 1957 |